US010902222B2

(12) United States Patent
Krishnasamy et al.

(10) Patent No.: US 10,902,222 B2
(45) Date of Patent: Jan. 26, 2021

(54) SYSTEMS AND METHODS FOR SELECTIVE LOCALIZATION OF A MULTI-FUNCTION DEVICE

(71) Applicant: XEROX CORPORATION, Norwalk, CT (US)

(72) Inventors: Muralidaran Krishnasamy, Chennai (IN); Narayan Kesavan, Chennai (IN); Raj Kumar, Chennai (IN)

(73) Assignee: XEROX CORPORATION, Norwalk, CT (US)

( * ) Notice: Subject to any disclaimer, the term of this patent is extended or adjusted under 35 U.S.C. 154(b) by 273 days.

(21) Appl. No.: 15/795,327

(22) Filed: Oct. 27, 2017

(65) Prior Publication Data

US 2019/0129945 A1 May 2, 2019

(51) Int. Cl.
*G06F 40/58* (2020.01)
*G06F 3/12* (2006.01)
*G06F 9/451* (2018.01)

(52) U.S. Cl.
CPC .......... *G06F 40/58* (2020.01); *G06F 3/1244* (2013.01); *G06F 3/1254* (2013.01);
(Continued)

(58) Field of Classification Search
CPC .............. G06Q 30/0277; H04L 67/125; H04L 41/0293; H04L 67/18; H04W 4/008;
(Continued)

(56) References Cited

U.S. PATENT DOCUMENTS 8,144,990 B2 * 3/2012 Englund ................ G06K 9/228
382/181
8,422,039 B2 * 4/2013 Kimura ................. G06F 3/1204
358/1.13
(Continued)

FOREIGN PATENT DOCUMENTS

JP 2006321190 A * 11/2006

OTHER PUBLICATIONS

U.S. Appl. No. 15/593,350, filed May 12, 2017; Systems and Methods for Localizing a User Interface on a Personal Device of a User; Muralidaran Krishnasamy et al.
(Continued)

*Primary Examiner* — William L Bashore
*Assistant Examiner* — Gregory A Distefano
(74) *Attorney, Agent, or Firm* — Jones Robb, PLLC

(57) ABSTRACT

The present disclosure discloses methods and systems for selective translation of a language of a multi-function device, wherein the language of the multi-function device is a pre-defined language. The method includes receiving a print job from a user along with one or more job attributes, wherein at least one job attribute indicates a local language of the user. Then, the local language is identified from the at least one job attribute. One or more job specific user interfaces are identified. Based on the identified local language of the user, the identified one or more job specific user interfaces are translated in the local language of the user and stored. After this, an input from the user is received. Based on the input, at least one translated job specific user interface is displayed in the local language of the user.

18 Claims, 10 Drawing Sheets

(52) U.S. Cl.
CPC .......... *G06F 3/1278* (2013.01); *G06F 3/1297* (2013.01); *G06F 9/454* (2018.02)

(58) Field of Classification Search
CPC ...... G06F 40/58; G06F 3/1244; G06F 3/1278; G06F 3/1297; G06F 3/1254; G06F 9/454
See application file for complete search history.

(56) References Cited

U.S. PATENT DOCUMENTS

| | | | | |
|---|---|---|---|---|
| 2005/0060378 A1* | 3/2005 | Girard | ................... | G06F 17/289 709/206 |
| 2005/0264830 A1* | 12/2005 | Une | ................... | G03G 15/5016 358/1.1 |
| 2007/0146823 A1* | 6/2007 | Borchers | ............ | H04N 1/00244 358/496 |
| 2009/0262387 A1* | 10/2009 | Sakakibara | ........ | H04N 1/00222 358/1.15 |
| 2009/0287471 A1* | 11/2009 | Bennett | ................. | G06F 40/263 704/3 |
| 2011/0258349 A1* | 10/2011 | Abe | ........................ | G06F 9/451 710/14 |
| 2016/0100070 A1* | 4/2016 | Nauta | ..................... | G06F 9/454 704/8 |
| 2016/0113859 A1* | 4/2016 | Brock | ................. | A61K 8/0241 424/401 |
| 2016/0170959 A1* | 6/2016 | Niles | ..................... | G06F 17/275 713/100 |
| 2017/0279990 A1* | 9/2017 | Xu | ........................ | G06F 3/1207 |

OTHER PUBLICATIONS

U.S. Appl. No. 15/593,352, filed May 12, 2017; Systems and Methods for Localizing a User Interface Based on Pre-Defined Settings Stored in a Personal Storage Device; Muralidaran Krishnasamy et al.

\* cited by examiner

```
%-12345x@PLJ JOB NAME= "S00000055.pdf"@PJL ENTER LANGUAGE=
   POSTSCRIPT%!PS%%begin%%ABCend%!PS-Adobe-3.0
%%Title: S000000055.pdf
%%Creator: PScript5.dll Version 5.2.2
%%CreationDate: 5/25/2017 18:35:16
%%For: harshvardhan.p
%%BoundingBox: (atend)
%%Pages: (atend)
%%Orientation: Portrait
%%PageOrder: (atend)
%%DocumentNeededResources: (atend)
%%DocumentSuppliedResources: (atend)
%%DocumentData: Clean7Bit
%%TargetDevice: (Global Print Driver)
%%LanguageLevel: 3
%%HiResBoundingBox: 36.7661 15 575.2340 777
%%CorpBox: 36.7661 15 575.2340 777
%ADO_BeginApplicationHeaderComments
%%Creator: Adobe Acrobat 11.0.20
%%For: harshvardhan.p
%%LanguageLevel: 3
%ADO_EndApplicationHeaderComments
%%DocumentProcessColors: (atend)
%%DocumentCustomColors: (atend)
%%hostLanguage: (Spanish)
%%DriverName: Global Print Driver PS%%DriverLanguage: English%%DCPVer:
   UNIV 5.496.7.1%%DriverBuildVer: 5.496.7.ON 2

%%BeginDefaults
%ADO_BeginApplicationDefaultsComments
%%ViewingOrientation: 1001
%ADO_EndApplicationDefaultsComments %%ViewingOrientation: 1001
%%EndDefaults
```

FIG. 4

SYSTEMS AND METHODS FOR SELECTIVE LOCALIZATION OF A MULTI-FUNCTION DEVICE

TECHNICAL FIELD

The presently disclosed embodiments are directed to the field of user interfaces, and more particularly to systems and methods for selective localization of one or more user interfaces of a multi-function device.

BACKGROUND

Business devices such as a multi-function device, a photocopier machine, a scanning device etc., allow users to perform various functions like printing, copying or scanning. With the advancement of technology, it has become a common practice in the consumer goods (or appliances) industries to configure languages in such devices/products based on geography or location where these devices are distributed, sold and/or operated. For example, if a consumer appliance (e.g., a photocopier machine) is intended to be distributed and/or sold in China, the consumer appliance is configured in Mandarin or Cantonese language. Similarly, if a consumer appliance is to be sold in Japan, the appliance is configured in Japanese language by default.

In this manner, it becomes easy for local people (i.e., people who understand Japanese language) to operate these devices but it becomes difficult for other users (users who don't understand or know Japanese language) to operate the same devices. For example, a person from the United States of America goes to a particular location in Japan, where all devices are configured in a native language of Japan and wishes to operate a scanning device. Here, the user may not be able to operate the device because he does not understand or is not well versed with the Japanese language. In such a scenario, the user has to rely on local users of that particular location who understand the Japanese language, i.e., the language configured in such devices.

At times, the business devices are configured with English language since it is the often language that people attempt to speak or read but still some users may not understand it properly, hence may not be able to operate these devices. Some solutions are available to change the language of the devices. For example, manufacturers provide options to select one or more preferred languages to operate the device, however, those options involve knowing the device by reading through manuals (e.g., booklet, or digital manuals), and manually select the preferred language and then operate the device. The manual selection of the preferred language by users may result in errors or may lead to discomfort to users and thus is not a desirable option. Moreover, the manual selection seems a time consuming activity. Also, if the device is already in a different language say, Japanese, then it is difficult to go till menu and change the language as the user does not understand the current language of the device. Other solutions include changing the language via voice feedback but it becomes difficult if a person is disabled or if the accent of the person is not very clear. In such cases, the voice feedback may not be helpful.

The language change scenario is commonly seen when we consider shared printers in a culturally diverse environment. In such scenarios, when a user submits a network job and approaches the device for diagnosing any error (paper jam, finisher error, fuser failure, etc.) or otherwise for checking the status of his job, there is a significant chance that the user interface/display language may be different from his preferred language. And the instructions/messages displayed on the user interface may not be understood by the user unless he manually changes the device language to suit his preference. However, the above mentioned solutions are not satisfactory.

Even if some solutions provide efficient way of language change but those solutions focus on changing the entire language of the machine/device instead of specific user interfaces or instructions. In view of the above, there is a need for efficient methods and systems.

SUMMARY

According to aspects illustrated herein, there is provided a method for selective translation of a language of a multi-function device, wherein the language of the multi-function device is a pre-defined language. The method includes receiving a print job from a user along with one or more job attributes, wherein at least one job attribute indicates a local language of the user. Then, the local language is identified from the at least one job attribute. One or more job specific user interfaces are identified. Based on the identified local language of the user, the identified one or more job specific user interfaces are translated in the local language of the user. After this, an input from the user is received. Based on the input, at least one translated job specific user interface is displayed in the local language of the user.

According to other aspects illustrated herein, a multi-function device is disclosed. The multi-function device includes a language module database, a receiving module, an input module and a local language module. The language database is configured for storing one or more local languages, one or more applications and one or more user interfaces, wherein the one or more user interfaces comprise one or more job specific user interfaces, wherein the one or more user interfaces are presented in a pre-defined language and further enable a user to perform one or more functions. The receiving module is configured for: receiving a print job from a computing device along with one or more job attributes, wherein at least one job attribute indicates a local language of the user. The input module is configured for receiving an input from the user. The local language module is configured for identifying a local language from the at least one job attribute; identifying one or more job specific user interfaces corresponding to the print job; translating the one or more job specific user interfaces to the local language of the user; and based on the input from the user, displaying at least one translated job specific user interface in the local language of the user, to perform a pre-defined function.

According to further aspects illustrated herein, a method to be implemented by a multi-function device is disclosed. The multi-function device presents one or more user interfaces in a pre-defined language of the multi-function device. The method includes receiving a print job from a computing device of a user along with one or more print job attributes, wherein at least one print job attribute comprises an operating system language of the computing device, wherein the operating system language of the computing device indicates a local language of the user. Then, the local language is identified based on the received print job and the one or more job attributes. It is then checked whether the identified local language of the user is different from the pre-defined language of the multi-function device. Based on the checking, one or more job specific user interfaces are identified. Based on the identified local language of the user, the pre-defined language of the one or more job specific user interfaces is changed to the local language of the user. The translated one or more job specific user interfaces are stored. An input from the user is received. Based on the input from the user, at least one translated job specific user interface is identified. The at least one identified job specific user interface is retrieved. And the at least one translated job specific user interface is presented in the local language of the user while one or more other user interfaces are shown in the pre-defined language of the multi-function device.

According to additional aspects illustrated herein, a system for selective localization is disclosed. The system includes a computing device including a print driver configured for receiving a print request from a user; extracting an operating system language of the computing device, wherein the operating system language of the computing device indicates a local language of the user; automatically creating a file comprising one or more job attributes, wherein at least one job attribute indicates the local language of the user; sending the print job request along with the one or more print job attributes to a multi-function device for further processing. The system further includes the multi-function device that is in communication with the computing device, configured for: receiving the print job request along with the one or more job attributes; identifying the local language based on the received print job and the one or more job attributes; checking whether the identified local language of the user is different from the pre-defined language of the multi-function device; identifying one or more job specific user interfaces; based on the identified local language of the user, changing the pre-defined language of the one or more job specific user interfaces to the local language of the user; storing the one or more job specific user interfaces in the local language of the user; receiving an input from the user; based on the input from the user, retrieving at least one translated job specific user interface; and presenting the at least one translated job specific user interface in the local language of the user while one or more other user interfaces are shown in the pre-defined language of the user.

Other and further aspects and features of the disclosure will be evident from reading the following detailed description of the embodiments, which are intended to illustrate, not limit, the present disclosure

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

FIG. 4 shows an exemplary file having one or more job attributes.

DESCRIPTION

Figure 1:
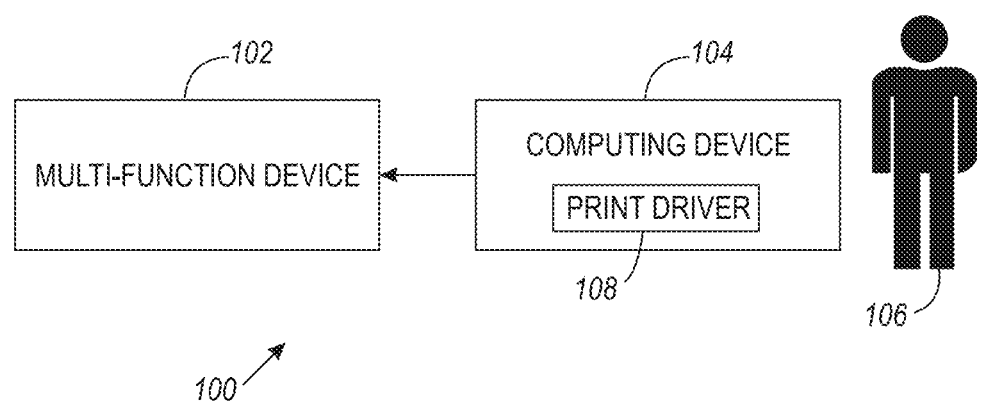
FIG. 1 is an environment in which various embodiments of the disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

Definitions of one or more terms that will be used in this disclosure are described below without limitations. For a person skilled in the art, it is understood that the definitions are provided just for the sake of clarity and are intended to include more examples than just provided below.

The term "multi-function device" refers to a device or a combination of multiple devices configured to perform one or more functions, but not limited to, scanning, printing, copying, imaging, and so forth. The multi-function device includes software, hardware, firmware, or combination thereof. The multi-function device is configured to operate in a pre-defined language by default, English, for example. The pre-defined language is based on geography or a location where the multi-function device is sold or distributed. In the context of the current disclosure, the multi-function device is configured to identify a local language of a user based on a print job and one or more job attributes, and to further translate one or more job specific user interfaces in the local language of the user. The multi-function device may include a number of components to perform the said functionality and this will be discussed in detail below.

The "pre-defined language" is the language in which the multi-function device is configured to operate and the pre-defined language is configured at the time of manufacturing. The pre-defined language is also called as a default language or a pre-configured language of the multi-function device. For example, the pre-defined language of the multi-function device may be, but not limited to, English. The pre-defined language is dependent on geography or location where the multi-function device is sold or distributed.

The term "local language" refers to the language which is understood or known to the user, who wishes to operate the multi-function device. Further, the local language is determined based on the one or more job attributes as received. The local language may also be termed as the native language of the user.

The term "user interface" is defined to include an interface shown on the multi-function device and is operable by the user to perform one or more functions such as change setting, check status, initiate scan, print, view print settings, fax, copy, or any other functions. A number of user interfaces are stored on the multi-function device, some user interfaces are specific to the job as received, while other user interfaces are generic and are not specific to the job as received from the user. The user interfaces related to print job may include but not limited to, print settings screen, job errors screen, jobs queue screen, individual job description screen and others.

The term "job" refers to a request from a user, for example, a print job request. The job is sent along with one or more job attributes.

A "computing device" refers to any device that the user typically uses for performing his daily tasks such as a laptop, a desktop, a personal computer, a mobile phone, a tablet, a personal digital assistant (PDA) or a combination thereof. Using the computing device, the user sends the job request, i.e., the print job.

The term "selective localization" refers to changing the pre-defined language of user interfaces which are specific to the job submitted by the user, while the remaining user interfaces are shown or remain in the pre-defined language of the multi-function device. The term may also be interchangbly used with the "selective translation." In particular, instructions, messages or content included in the job specific user interfaces are changed based on an input from the user.

The term "server" refers to any entity or a device capable of communicating with the multi-function device and further configured for storing the local language of the user.

Overview

Typically devices such as multi-function devices are manufactured such that the devices overall provide same kind of functionality to all users. But due to different languages adopted across the world, the manufacturers configure these devices in a language specific to a region, where these devices are sold or distributed. Most of the people are able to operate the device in a default language but some people (outside users or other users) may not be comfortable to operate the multi-function device in the default language. In order to enable such users to operate the multi-function device according to their comfort or languages known to them, the present disclosure is implemented. The present disclosure provides methods and systems for localizing a user interface of a device, for example, a multi-function device. In particular, the methods and systems implement selective localization of one or more user interfaces which are specific to job instead of the entire multi-function device or all user interfaces of the multi-function device.

Exemplary Environment

FIG. 1 is an exemplary environment 100 in which various embodiments of the disclosure can be practiced. Reference to other figures may be made while discussing FIG. 1. The environment 100 includes a multi-function device 102, a computing device 104 having a print driver 108 and a user 106. The user 106 uses the computing device 104 for his day-to-day tasks such as emails, surfing, reading, work, etc. The user 106 operates or uses the multi-function device 102 for his tasks such as printing, copying, imaging, scanning, or a combination of these. The computing device 104 may be connected to the multi-function device 102 via a network (although not shown). The network may be a wireless network, a wired network, or a combination thereof. The network may also be an individual network or a collection of many such individual networks, interconnected with each other and functioning as a single large network, for example, the Internet or an intranet. The network may be implemented as one of the different types of networks, such as intranet, local area network (LAN), wide area network (WAN), the internet, near field communication (NFC), and such. The network may either be a dedicated network or a shared network, which represents an association of the different types of networks that use a variety of protocols. Further, the network may include network devices, such as network switches, hubs, routers, HBAs, for providing a communication link between the multi-function device 102 and other connected devices/systems.

Using the computing device 104, the user 106 submits a job such as a print job to the multi-function device 102. The print job includes a document for printing and the document includes one or more pages. Each page may include content in the form of text, image, graphics or a combination thereof. The document may be of any format such as PDF, MS word, MS ppt, or the like. The document may include the content in a local language of the user 106, while the document may not include content in the local language of the user 106. The language of the content does not interfere in the implementation of the present disclosure. When the user 106 submits the print job request, the request is received by the print driver 108 of the computing device 104. The print driver 108 then identifies one or more job attributes. The print driver 108 then submits the print job along with the one or more job attributes, where at least one job attribute indicates a local language of the user 106. Various examples of the job attributes include, but not limited to, document type, orientation, pages, content, source language or the like. Here, the source language (may also be referred to a host language) represents the language of the computing device 104 (i.e., of an operating system of the computing device 104) and indicates the local language of the user 106. The print driver 108 extracts an operating system language of the computing device 104.

The multi-function device 102 receives the print job along with the job attributes. Upon receiving, the multi-function device 102 identifies the local language of the user 106 and then identifies one or more user interfaces which are specific to the print job. The multi-function device 102 then translates the pre-defined language of the job specific user interfaces to the local language of the user 106. Based on an input from the user 106, the multi-function device 102 presents at least one translated version of the job specific user interface to the user 106 while the remaining user interfaces (one or more other user interfaces) are shown in the pre-defined language of the multi-function device 102.

Exemplary System

Figure 2:
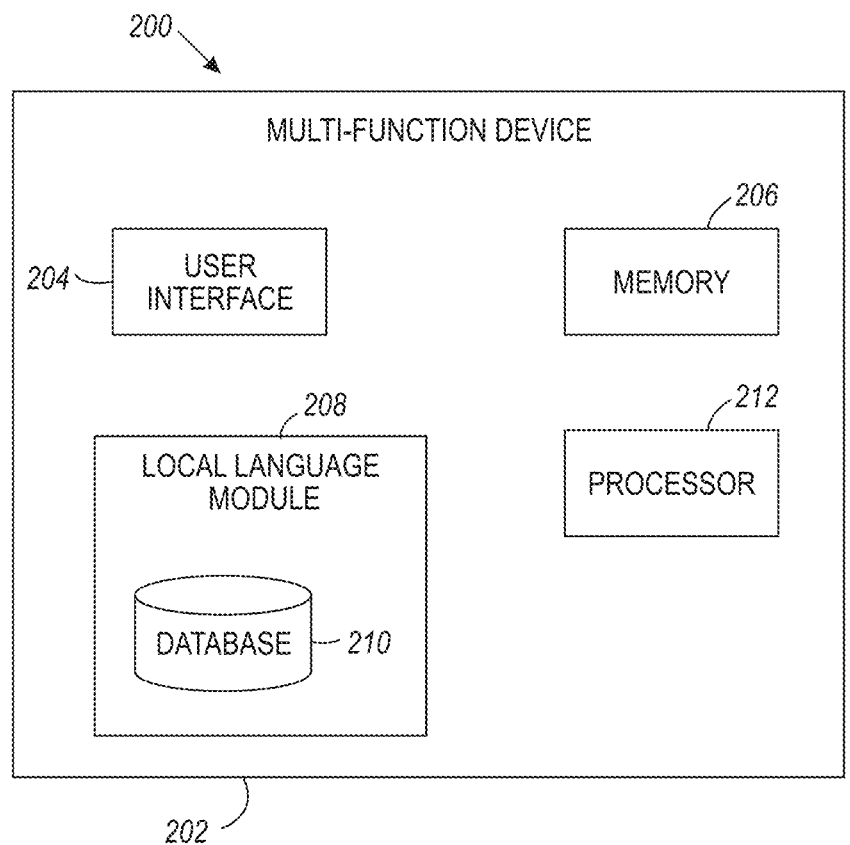
FIG. 2 is an overall system for selective localization of a user interface of a multi-function device.

FIG. 2 shows an overall system 200 for selective localization of a multi-function device 202. Reference to other figures can be made while discussing FIG. 2. As shown, the system 200 includes the multi-function device 202 and a computing device (although not shown in FIG. 2). The multi-function device 202 includes one or more user interfaces 204, a memory 206, a local language module 208, a database 210, and a processor 212. Each of the components 204, 206, 208, 210, and 212 are coupled to each other via a communication bus or later developed protocols and also each of the components communicate with each other for selective localization of the multi-function device 202. The multi-function device 202 may include one or more additional components as required to implement the current disclosure.

By default, the multi-function device 202 is configured to operate in a pre-defined language. The pre-defined language is based on geography where the multi-function device 202 is distributed or sold. For example, if there is a multi-function device 202 in the United States, the multi-function device 202 is operable in the language English. In another example, if the multi-function device 202 is sold in Japan, the multi-function device 202 is operable in Japanese language. The multi-function device 202 presents the one or more user interface 204 in the pre-defined language or the default language. As a result, all the user interfaces 204 display one or more options to the user for operating the multi-function device 202 in the pre-defined language only. The one or more options may relate to printing, scanning, change settings, initiate scan, or the like.

As shown, the database 210 stores one or more local languages such as English, Italian, German, Dutch, Swedish, Romanian, Japanese, Chinese, French, Spanish, or the like. The database 210 further may store the print job and the job attributes as received via the computing device of the user. The database 210 further stores one or more applications and one or more user interfaces 204, wherein the one or more user interfaces 204 include one or more job specific user interfaces, wherein the one or more user interfaces are presented in a pre-defined language and further enable a user to perform one or more functions.

Specifically, the one or more user interfaces 204 include app specific user interfaces, job specific user interfaces or the like. In the app specific user interfaces, some user interfaces are specific to scan function, while some may be specific to print function and so on. The job specific user interfaces may include a user interface for displaying print settings/properties, a user interface for displaying all print jobs in a queue, a user interface for pausing the print job, a user interface for displaying an error message, and so on.

Initially, the user who wishes to use the multi-function device 202 submits a print job to the multi-function device 202. The print job is sent via the computing device, i.e., in particular through the print driver of the computing device as discussed above. The print driver automatically creates a file including one or more job attributes. One exemplary file 400 is shown in FIG. 4. The file 400 includes job attributes such as pages 402, an orientation 404, creator 406, and a host language 408. Here, the attribute host language 408 indicates the local language of the user. The file 400 and the attributes 402, 404, 406, and 408 can be in any desired format without limiting the scope of the disclosure.

A receiving module (although not shown) receives the print job along with the job attributes from the computing device, where at least one job attribute indicates a local language of the user. The at least one job attribute is an operating system language of the computing device and thus indicates the local language of the user.

Upon receiving the print job, the processor 212 triggers the local language module 208 for selective localization of the multi-function device 202. The local language module 208 receives the print job along with the one or more print job attributes. The local language module 208 identifies the local language of the user based on the at least one job attribute, i.e., the language of the computing device. The local language module 208 further checks whether the identified local language of the user is different from the pre-defined language of the multi-function device 202. If different, the local language module 208 proceeds further to identify one or more job specific user interfaces corresponding to the received job. For example, if the received job is a print job, then all user interfaces corresponding to the received print job are identified and retrieved from the database 210. Thereafter, the user interfaces specific to the print job are translated, i.e., the pre-defined language of the job specific user interfaces is changed to the identified local language of the user. The local language module 208 then receives an input from the user. An input module receives the input from the user and the input is then passed to the local language module 208. The input may be in the form of touching a pre-defined button or section on the multi-function device 202 or a print queue at the multi-function device 202. Based on the input from the user, the local language module 208 identifies the corresponding stored job specific user interface and retrieves the identified user interface from the database 210. Finally, the retrieved job specific user interface is displayed to the user in the local language of the user to perform one or more functions or a pre-defined function. This helps the user to easily operate the multi-function device 202 and performs the required action/function such as clear paper jam, view job status, view print settings, change print settings, or the like. In this manner, the user can operate the multi-function device 202 using the local language of the user.

In some cases, the local language module 208 presents the translated version of the job specific user interface when a specific/pre-defined event occurs. The translated user interface displays such as error messages, scheduling request messages, jam clearance instructions, etc.

Before translating, the local language module 208 checks the availability of the local language with the multi-function device 202. The local language module 208 then retrieves the identified local language from the database 210 or the memory 206. In cases where the identified local language is not available with the multi-function device 202 or the database 210, the multi-function device 202 contacts an external device such as, but not limited to, a server such as a web server, a data server, an external storage, a cloud system, a desktop PC, a notebook, portable computer, a workstation, a mainframe computer, an internet appliance, or the like. The multi-function device 202 contacts the server via a network. The network may be a wireless network, a wired network, or a combination thereof. The network may also be an individual network or a collection of many such individual networks, interconnected with each other and functioning as a single large network, for example, the Internet or an intranet. The network may be implemented as one of the different types of networks, such as intranet, local area network (LAN), wide area network (WAN), the internet, near field communication (NFC), and such. The network may either be a dedicated network or a shared network, which represents an association of the different types of networks that use a variety of protocols. Further, the network may include network devices, such as network switches, hubs, routers, HBAs, for providing a communication link between the multi-function device and other connected devices/systems.

As shown, the memory 206 stores the received document as well as job attributes of the print job. The memory 206 may further include one or more language databases such as database 210 or may also store one or more languages. The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, a compact disks (CDs), digital versatile disc or digital video disc (DVDs) and magnetic tapes.

Exemplary Case

An example is discussed for easy understanding of the disclosure. It is considered that a user submits a job from his computing device running in French to a device such as a printer running in English. As a next step, the printer begins processing the job. During processing, the printer runs out of media and goes into the "held" state. The printer identifies the computing device language as French, does a preemptive translation of the messages/instructions relevant in context of the print job and stores it in the memory. When the user approaches the printer to diagnose the issue/check his job status. The user views the message/instruction on the LUI but doesn't understand as the instructions are in English. The user touches the title bar of the message window as a result the message/instruction is instantaneously displayed in French using the preemptive translation done earlier while the other user interfaces or messages remain in the English language. As a result, the user understands the message and takes appropriate action, i.e., informing an admin user, inserting media, or the like.

Exemplary Flowchart

Typically, a multi-function device is pre-configured with a language such as English, that is location or geography dependent language. As a result, all options such as an email, fax, photocopy, print, scan or the like, are presented to the user in the pre-configured language via a user interface. For example, the multi-function device may include a user interface in English language if the machine is imported/exported/sold in countries like the United States of America, United Kingdom, etc., and may or may not have the option to change the language preference. Even though if the devices have language change options, those language change options are not desirable. Moreover, the existing solutions change the entire language of the multi-function device instead of a specific user interface or instructions on a user interface as required by the user. Thus, the known methods and systems are not efficient. In light of this, the present disclosure discloses methods and systems to change language of one or more user interfaces which are specific to job as received from the user instead of the entire multi-function device. In particular, the methods and systems implement selective translation of instructions on a user interface based on language settings of operating system from which the job is sent.

Figure 3:
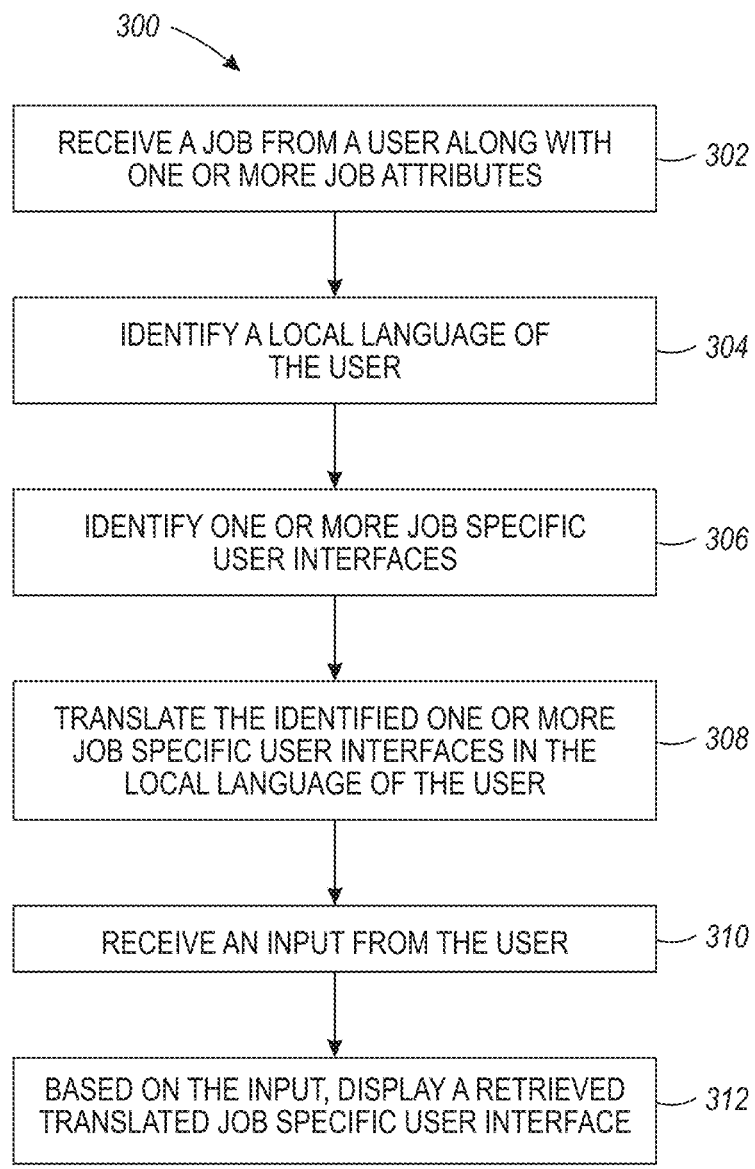
FIG. 3 shows a method flowchart for selective localization of a user interface based on a job.

FIG. 3 is a method flowchart 300 for selective localization of a user interface of a device. Various examples of the device include, but are not limited to, a printer, a multi-function device, or the like. Reference to other figures can be made while discussing FIG. 3. The method begins with receiving a job from a user along with one or more job attributes at 302, wherein at least one job attribute indicates a local language of a user. The print job is sent by the user via a computing device. In particular, when the user submits a print command, a print driver running on the computing device receives the request from the user and automatically creates a file including one or more job attributes related to the print job. The job attributes without any limitation may include content, type of document, orientation, page, host language etc. Here the host language is the language of the computing device or of an operating system of the computing device. The file and the job attributes are in a pre-defined format as shown in FIG. 4. Upon creating the file, the print driver sends the print job along with the job attributes to the multi-function device for further processing and printing the job.

Based on the received print job and at least one job attribute, the local language of the user is identified at 304. An operating system language of the computing device is extracted from the at least one job attribute as received from the user. It is then checked whether the identified local language of the user is different from the pre-defined language of the multi-function device. If the identified local language of the user is same as that of the pre-defined language of the multi-function device, the method proceeds with conventional ways of printing the received job. If the identified local language is different from the pre-defined language of the multi-function device, the method of the present disclosure is implemented. Then at 306, one or more job specific user interfaces are identified. The job specific user interfaces may include a user interface for displaying job settings, a user interface for error message, a user interface for showing job progress or other job specific user interfaces. After identification, the local language is retrieved from the multi-function device. If the identified local language is not available with the multi-function device, the local language is retrieved and downloaded from a server.

Based on the identified local language of the user, the identified one or more job specific user interfaces are translated in the local language of the user at 308. The translation includes changing the pre-defined language of the identified job specific user interfaces to the identified local language of the user. The translated one or more job specific user interfaces are then stored for later retrieval.

Then, an input from the user is received at 310. The input may be touching a pre-defined button or a section on the multi-function device. While the input may be touching the print job as present in a job queue at the multi-function device. Specifically, the input from the user is received on a particular user interface. Based on the input, the corresponding at least one translated job specific user interface is retrieved when the user provides the input. Based on the input from the user, a stored translated job specific user interface is identified and retrieved. For example, if the user touches the job present in the queue, the corresponding stored user interface may be a user interface indicating job settings in the local language. In another example, if the user touches a pre-defined section or an area on the multi-function device, the corresponding stored user interface may be a user interface indicating the job progress in the local language of the user. These are just few examples where the user interface is displayed in the local language of the user when the user provides his input via the multi-function device, however there can be many variations or more examples.

At 312, the retrieved translated job specific user interface is displayed/presented in the identified local language of the user. While other user interfaces (i.e., which are not specific to the job) in the background or otherwise are shown in the pre-defined language of the multi-function device. The translated job specific user interface is shown to the user for any action or to display a message corresponding to the print job. The action may be adding more cartridge to the multi-function device, clear the paper jam or the like.

In some embodiments, the translated one or more job specific user interfaces are displayed when a pre-defined event occurs. For example, a job is running and paper gets jammed in the multi-function device. In such cases, the error message is displayed in the local language of the user.

Exemplary Snapshots

For better understanding of the disclosure, exemplary snapshots are discussed in conjunction with FIGS. 5A-5B, 6A-6B and 7A-7B.

Figure 5A:
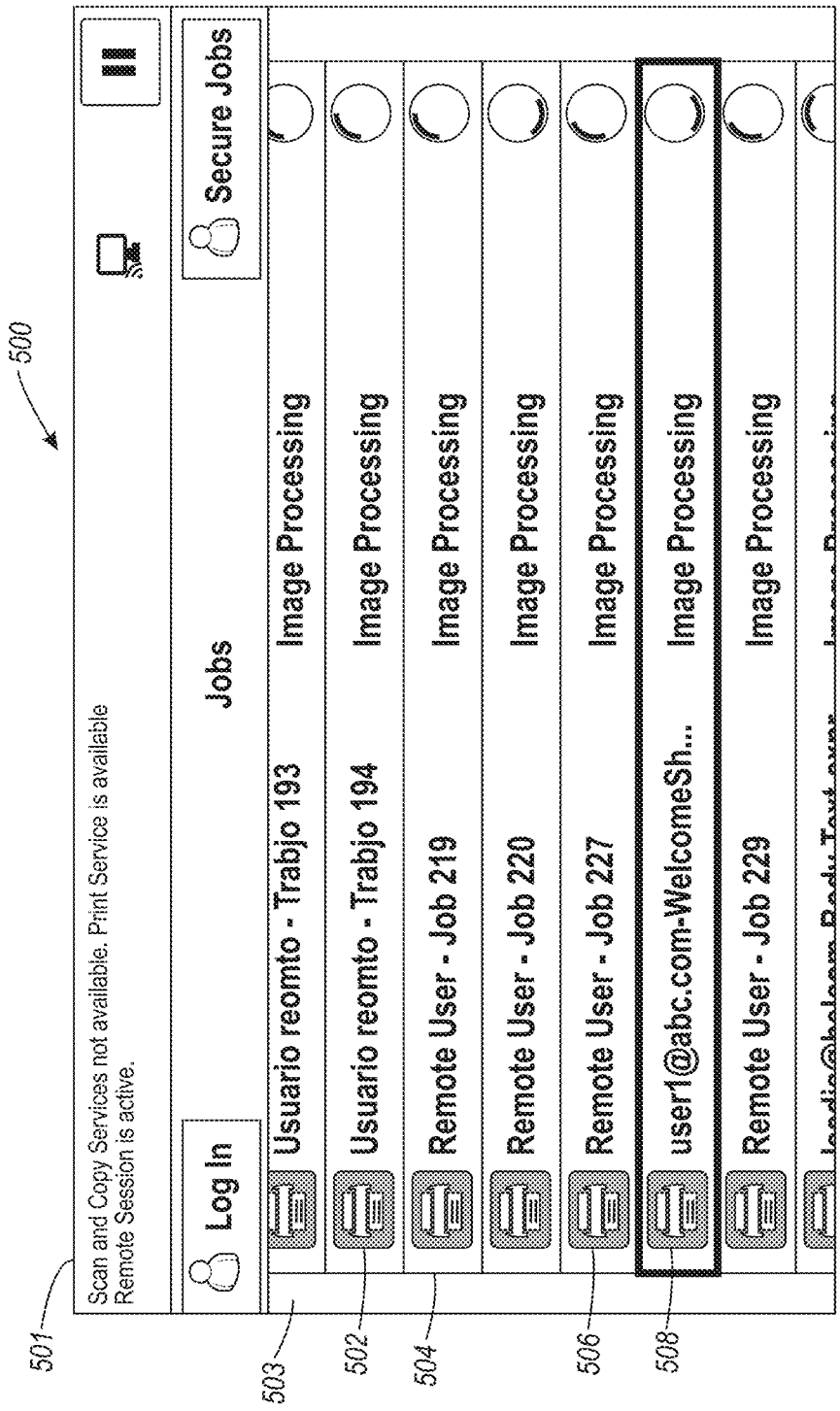
FIGS. 5A-5B represent snapshots indicating multiple print jobs in a queue.
Figure 5B:
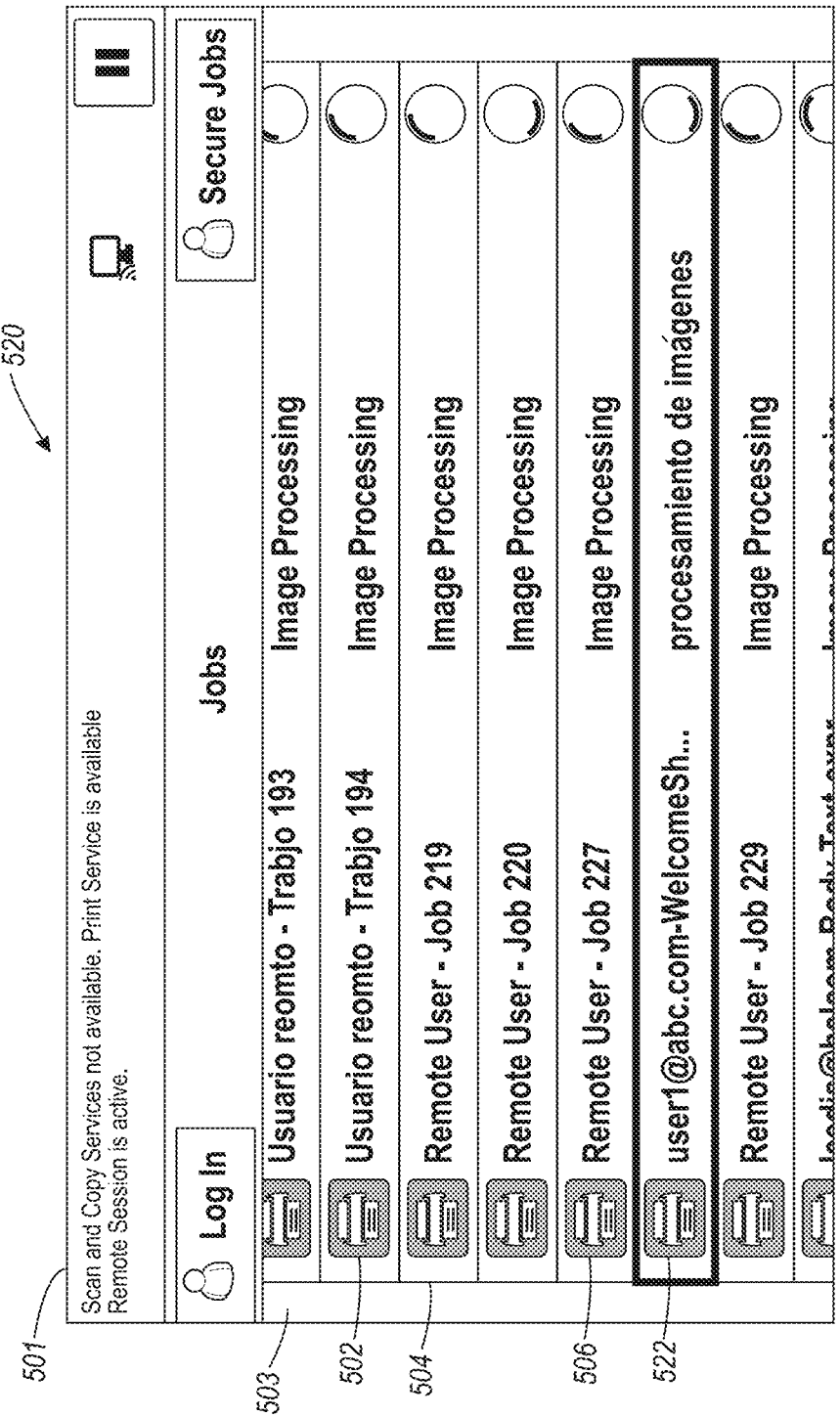
Figure 6A:
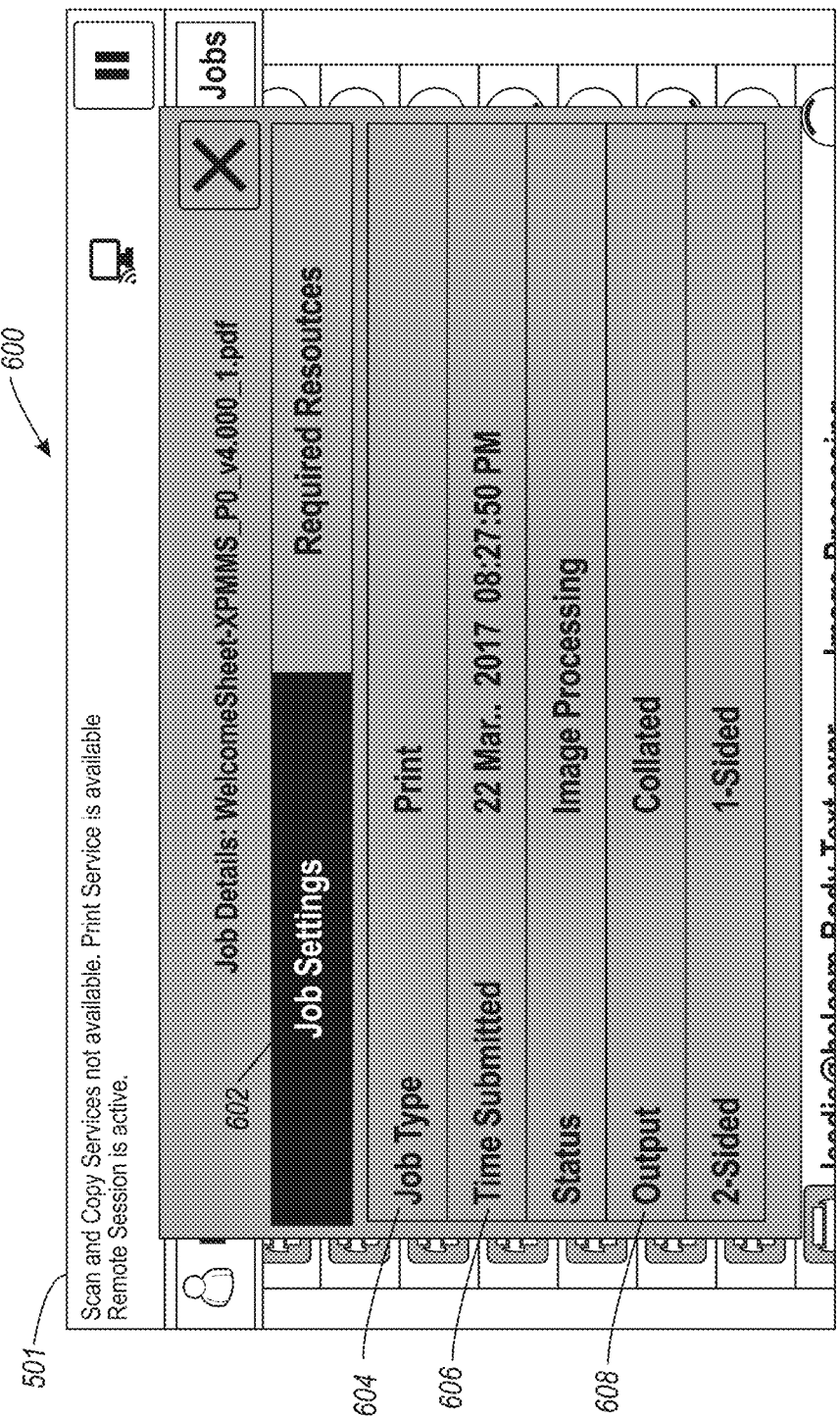
FIGS. 6A-6B show user interfaces in a pre-defined language and in a local language of the user, respectively.
Figure 6B:
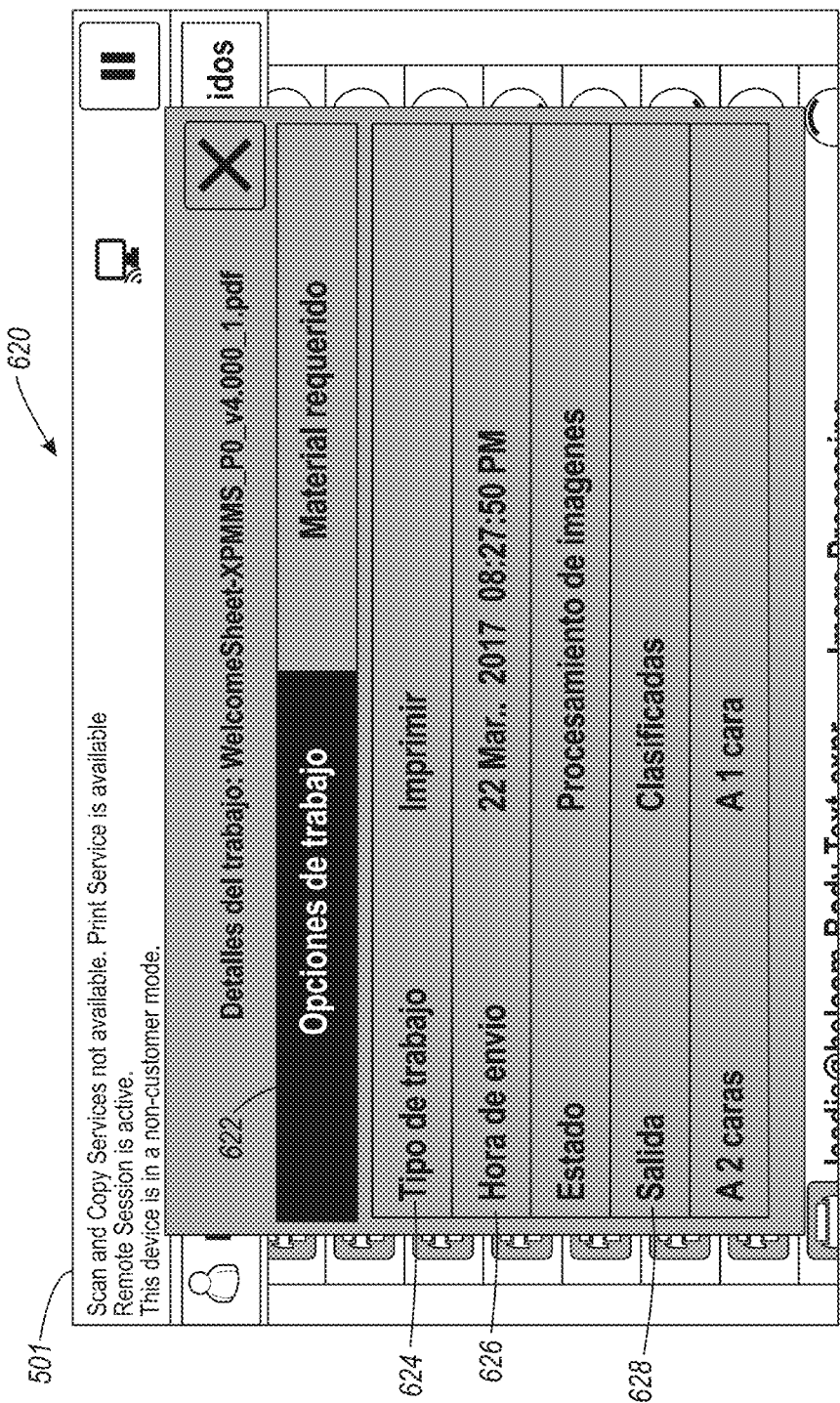
Figure 7A:
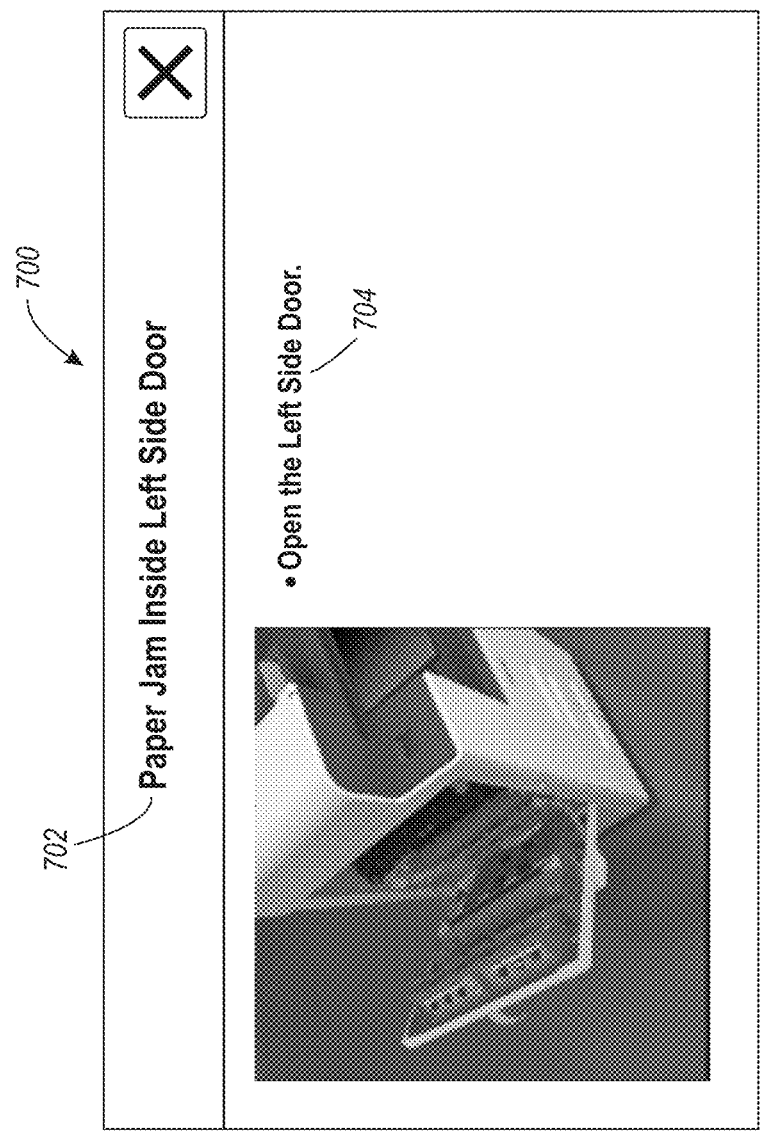
FIGS. 7A-7B show user interfaces in a pre-defined language and in a local language of the user, respectively.
Figure 7B:
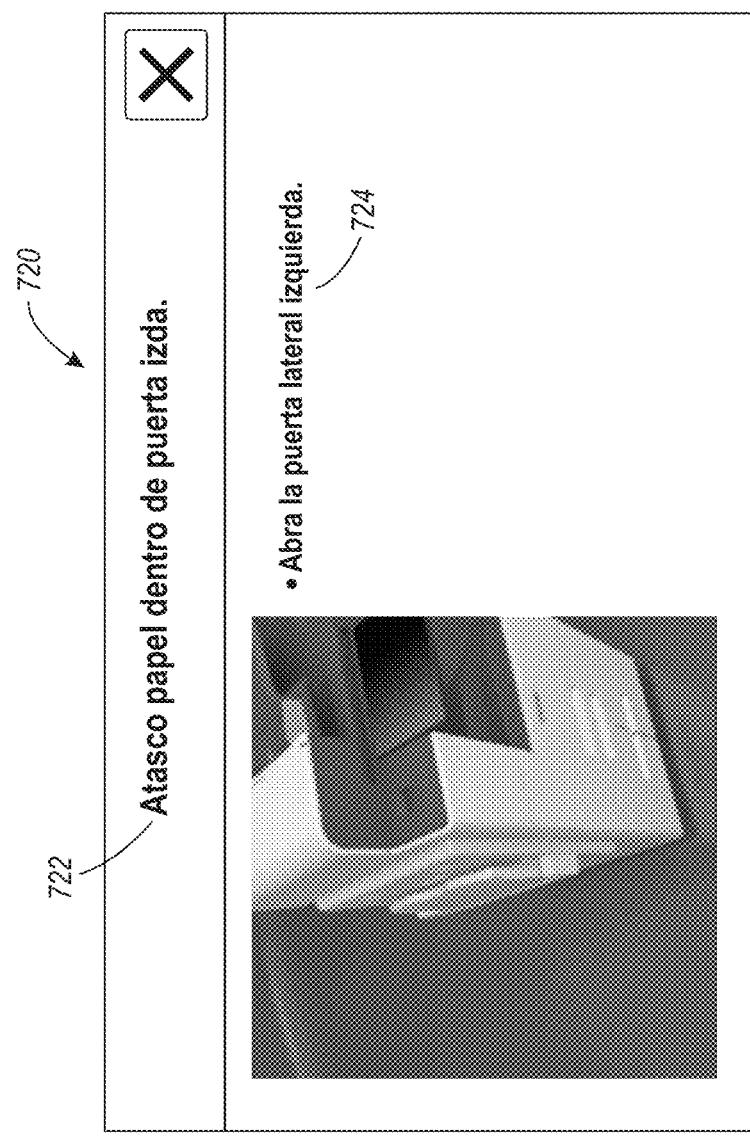

As shown in FIG. 5A, a multi-function device 500 is shown that receives multiple print jobs from multiple users such as job 502, 504, 506, and 508. The user interface marked as 501 indicates a standard user interface of the multi-function device, while the user interface 503 is a user interface for displaying print jobs to the users. By default, the interfaces 501 and 503 are shown in a pre-defined language of the multi-function device, English, for example. The job 508 is considered for discussion purposes. Further, when the user touches a pre-defined section on the multi-function device 500, the instructions/details related to job 508 are translated to the local language of the user i.e., Spanish as indicated by 522 in the snapshot 520 of FIG. 5B. Further, a user interface 602 is displayed in the form of snapshot 600, FIG. 6A. The interface 602 shows job settings such as job type 604, time submitted 606 and output 608. The interface 602 is shown in the pre-defined language of the multi-function device if the identified local language is same as the pre-defined language of device. But if the identified local language is different from the pre-defined language of the device, the snapshot 620 of the user interface is shown in the local language, marked as 622 in FIG. 6B. The local language of the user is French in this particular case. The interface 622 shows job setting parameters such as 624, 626 and 628 in French language, while the interface in background 501 is shown in the pre-defined language of the device. In this manner, the present disclosure changes only the interface which are specific to the print job and are changed when the user provides the input.

Similarly when a pre-defined event occurs such as paper jam while executing the print job 508. Other pre-defined events may relate to finisher error, fuser failure, etc. The message is displayed via a user interface 700 of FIG. 7A in the pre-defined language. The messages are marked as 702 and 704. If the pre-defined language is different from the local language, the message is displayed via a user interface 720 of FIG. 7B in the local language of the user, i.e., Spanish in the particular case. The messages are shown in the Spanish language, marked as 722 and 724.

The present disclosure discloses methods and systems for selective localization of a user interface of a multi-function device. In particular, the methods and systems only change instructions displayed on a user interface instead of the entire user interface in background or other user interfaces, thereby facilitating smoother and faster translation. In this manner, a lot of processing time is saved and is less cumbersome. In other words, the methods and systems do not change the overall language of the device. Further, the implementation of the disclosure does not require any hardware changes to existing devices and/or systems. Without much interaction with the multi-function device, the disclosure allows the user to change the default language to the local language. Additionally, without knowing or with minimal knowledge on the current language of the multi-function device, the disclosure allows the user to change the default language to the local language of the user.

For a person skilled in the art, it is understood that the use of phrase(s) "is," "are," "may," "can," "could," "will," "should," or the like, is for understanding various embodiments of the present disclosure and the phrases do not limit the disclosure or its implementation in any manner.

It is emphasized that the term "comprises" or "comprising" is used in this specification to specify the presence of stated features, integers, steps or components, but does not preclude the addition of one or more further features, integers, steps or components, or groups thereof.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above described system and/or the apparatus and/or any electronic device (not shown)

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "translating," or "changing," or "displaying," or "storing," or "identifying," "or receiving," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for selective translation of a language of a multi-function device, wherein the language of the multi-function device is a pre-defined language, the method comprising:
    receiving a print job from a user along with one or more job attributes, wherein at least one job attribute indicates a local language of the user;
    identifying the local language from the at least one job attribute;
    checking whether the pre-defined language of the multi-function device is different from the local language of the user;
    identifying one or more job specific functional user interfaces corresponding to the print job from amongst a plurality of functional user interfaces displayable on the multi-function device, wherein the plurality of functional user interfaces comprises a functional user interface not specific to the print job, a functional user interface operable by the user to perform one or more functions;
    based on the identified local language of the user, selectively translating the identified one or more job specific functional user interfaces into the local language of the user, wherein the functional user interface not specific to the print job remains in the pre-defined language;
    receiving an input from the user; and
    based on the input, displaying one or more translated job specific functional user interfaces corresponding to the print job in the local language of the user and the functional user interface not specific to the print job in the pre-defined language on the multi-function device, the one or more translated job specific functional user interfaces superimposed on the functional user interface not specific to the print job in the pre-defined language.

2. The method of claim 1, wherein the multi-function device stores one or more job specific functional user interfaces in the pre-defined language of the multi-function device.

3. The method of claim 1, wherein the input comprises touching a pre-defined section on the multi-function device.

4. The method of claim 1, wherein the input comprises touching the print job in a print queue.

5. The method of claim 1, further comprising storing the translated one or more job specific functional user interfaces.

6. The method of claim 1, further comprising retrieving the one or more translated job specific functional user interfaces when the user provides the input.

7. The method of claim 1, further comprising displaying at least one translated job specific functional user interface when a pre-defined event occurs.

8. The method of claim 1, wherein the at least one job attribute comprises an operating system language of a computing device, and the operating system language indicates the local language of the user.

9. A multi-function device, comprising:
    a processor;
    a language database when executed by the processor stores one or more local languages, one or more applications, and a plurality of functional user interfaces, wherein the plurality of functional user interfaces comprise one or more job specific functional user interfaces and a functional user interface not specific to a print job, wherein the plurality of functional user interfaces are presented in a pre-defined language and further enable a user to perform one or more functions;

a receiving module when executed by the processor receives a print job from a computing device along with one or more job attributes, wherein at least one job attribute indicates a local language of the user;

an input module when executed by the processor receives an input from the user; and a local language module when executed by the processor:
identifies a local language from the at least one job attribute;
checks whether the pre-defined language of the multi-function device is different from the local language of the user;
identifies one or more job specific functional user interfaces corresponding to the print job from amongst the plurality of functional user interfaces of the multi-function device;
selectively translates the one or more job specific functional user interfaces to the local language of the user, wherein the functional user interface not specific to the print job remains in the pre-defined language; and
based on the input from the user, displays at least one translated job specific functional user interface corresponding to the print job in the local language of the user, to perform a pre-defined function, and the functional user interface not specific to the print job in the pre-defined language on the multi-function device, the one or more translated job specific functional user interfaces superimposed on the functional user interface not specific to the print job in the pre-defined language.

10. The multi-function device of claim 9, wherein the local language module when executed by the processor further stores the plurality of functional user interfaces in the pre-defined language.

11. The multi-function device of claim 9, wherein the local language module when executed by the processor retrieves the at least one translated job specific functional user interface when the user provides the input.

12. The multi-function device of claim 9, wherein the at least one job attribute comprises an operating system language of a computing device, and the operating system language indicates the local language of the user.

13. A method to be implemented by a multi-function device, wherein the multi-function device presents a plurality of functional user interfaces in a pre-defined language of the multi-function device, the method comprising:
receiving a print job from a computing device of a user along with one or more job attributes;
identifying a local language based on the received print job and the one or more job attributes;
checking whether the identified local language of the user is different from the pre-defined language of the multi-function device;
based on the checking, identifying one or more job specific functional user interfaces from the plurality of functional user interfaces, wherein the plurality of functional user interfaces comprises a functional user interface not specific to the print job a functional user interface operable by the user to perform one or more functions;
based on the identified local language of the user, changing selectively translating the one or more job specific functional user interfaces to the local language of the user, wherein the functional user interface not specific to the print job remains in the pre-defined language;
storing the translated one or more job specific functional user interfaces;
receiving an input from the user;
based on the input from the user, identifying at least one translated job specific functional user interface;
retrieving the at least one identified translated job specific functional user interface; and
presenting the at least one translated job specific functional user interface in the local language of the user while one or more other functional user interfaces are shown in the pre-defined language of the multi-function device, the at least one translated job specific functional user interface superimposed on the one or more other functional user interface in the pre-defined language of the multi-function device.

14. The method of claim 13, further comprising displaying at least one translated job specific functional user interface when a pre-defined event occurs.

15. The method of claim 13, wherein the multi-function device stores one or more job specific functional user interfaces in the pre-defined language of the multi-function device.

16. The method of claim 13, wherein the one or more job attributes comprise an operating system language of a computing device, and the operating system language indicates the local language of the user.

17. A system for selective localization, the system comprising:
a computing device, the computing device comprising a print driver configured for:
receiving a print job request from a user,
extracting an operating system language of the computing device, wherein the operating system language of the computing device indicates a local language of the user,
automatically creating a file comprising one or more job attributes, wherein at least one job attribute indicates the local language of the user, and
sending the print job request along with the one or more job attributes to a multi-function device for further processing; and
the multi-function device in communication with the computing device, configured for:
receiving the print job request along with the one or more job attributes,
identifying the local language based on the received print job and the one or more job attributes,
checking whether the identified local language of the user is different from a pre-defined language of the multi-function device,
identifying one or more job specific functional user interfaces from a plurality of functional user interfaces of multi-function device, wherein the plurality of functional user interfaces comprises a functional user interface not specific to the print job, a functional user interface operable by the user to perform one or more functions,
based on the identified local language of the user, selectively changing a pre-defined language of the one or more job specific functional user interfaces to the local language of the user, wherein the functional user interface not specific to the print job remains in the pre-defined language,
storing the one or more job specific functional user interfaces in the local language of the user, receiving an input from the user;

based on the input from the user, retrieving at least one translated job specific functional user interface, and selectively presenting the at least one translated job specific functional user interface in the local language of the user while one or more other functional user interfaces are shown in the pre-defined language of the multi-function device, the at least one translated job specific functional user interface superimposed on the one or more other functional user interface in the pre-defined language of the multi-function device.

18. The system of claim 17, further comprising a database for storing one or more functional user interfaces.

* * * * *